Figure 8:
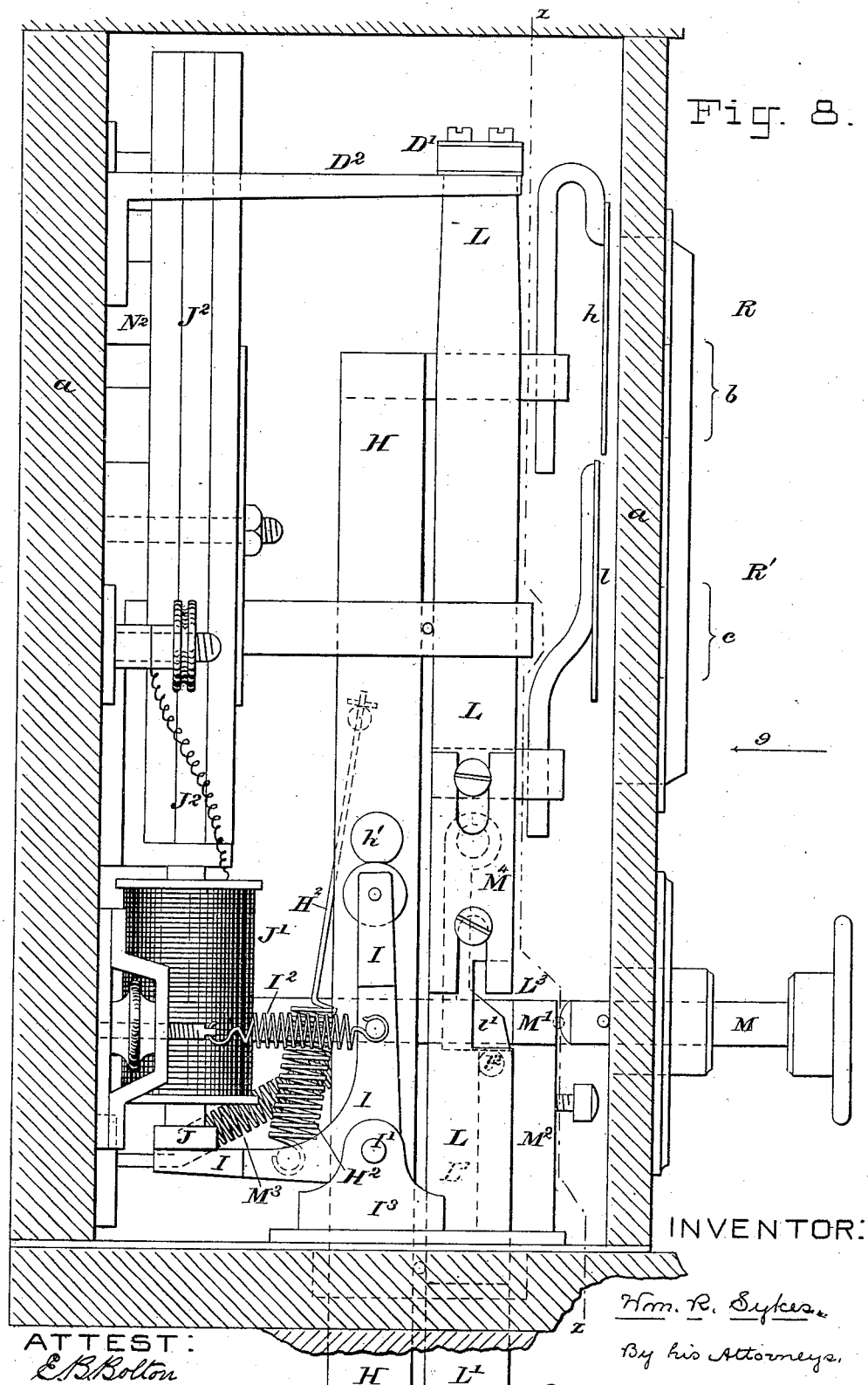

(No Model.)  9 Sheets—Sheet 1.
W. R. SYKES.
Electric Railway Signal Apparatus.
No. 241,246. Patented May 10, 1881.
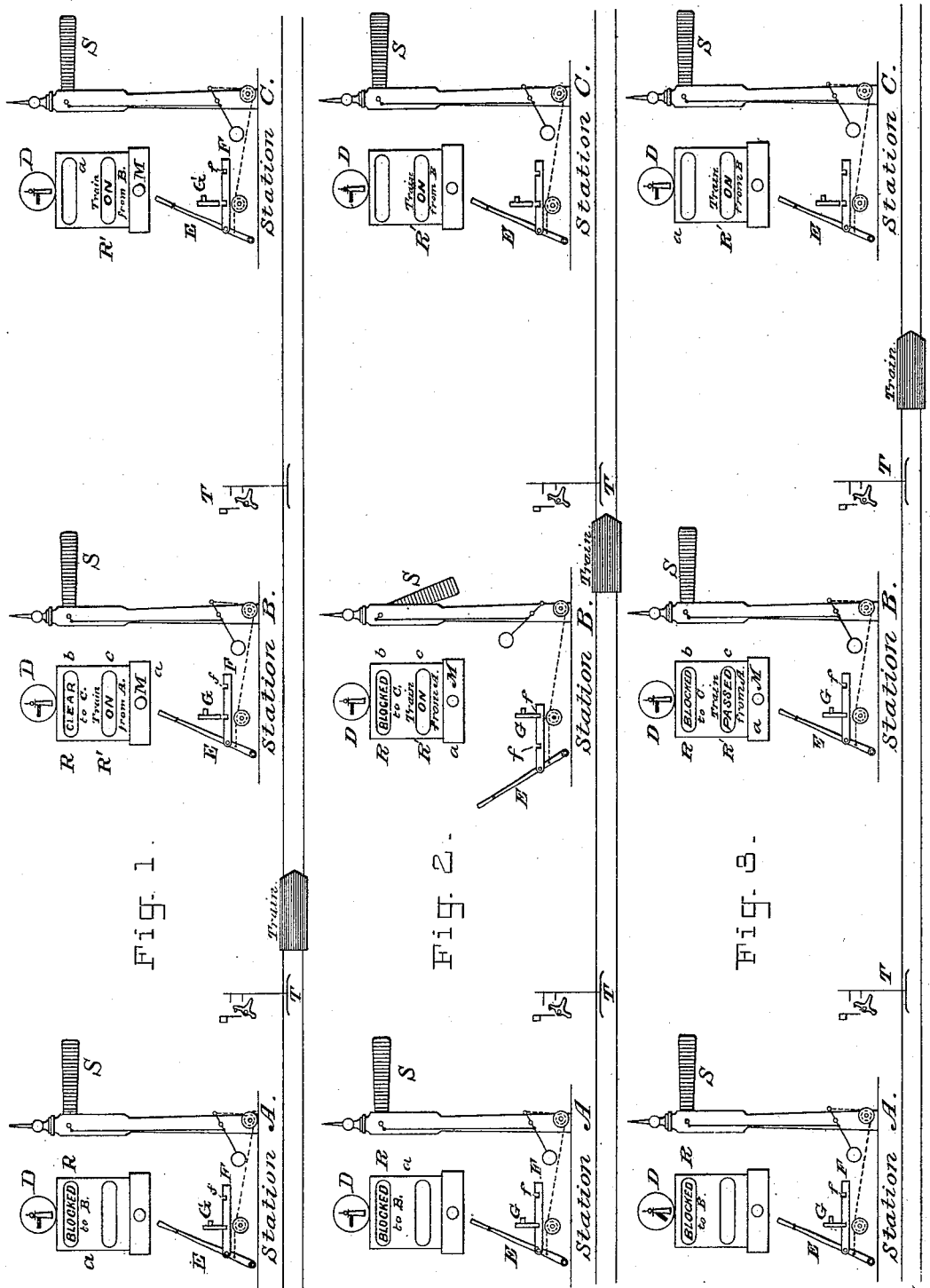
ATTEST:
E. B. Bolton
Geo. Bainton
INVENTOR:
William R. Sykes,
By his Attorneys
Burke, Fraser & Connett
N. PETERS, Photo-Lithographer, Washington, D. C.

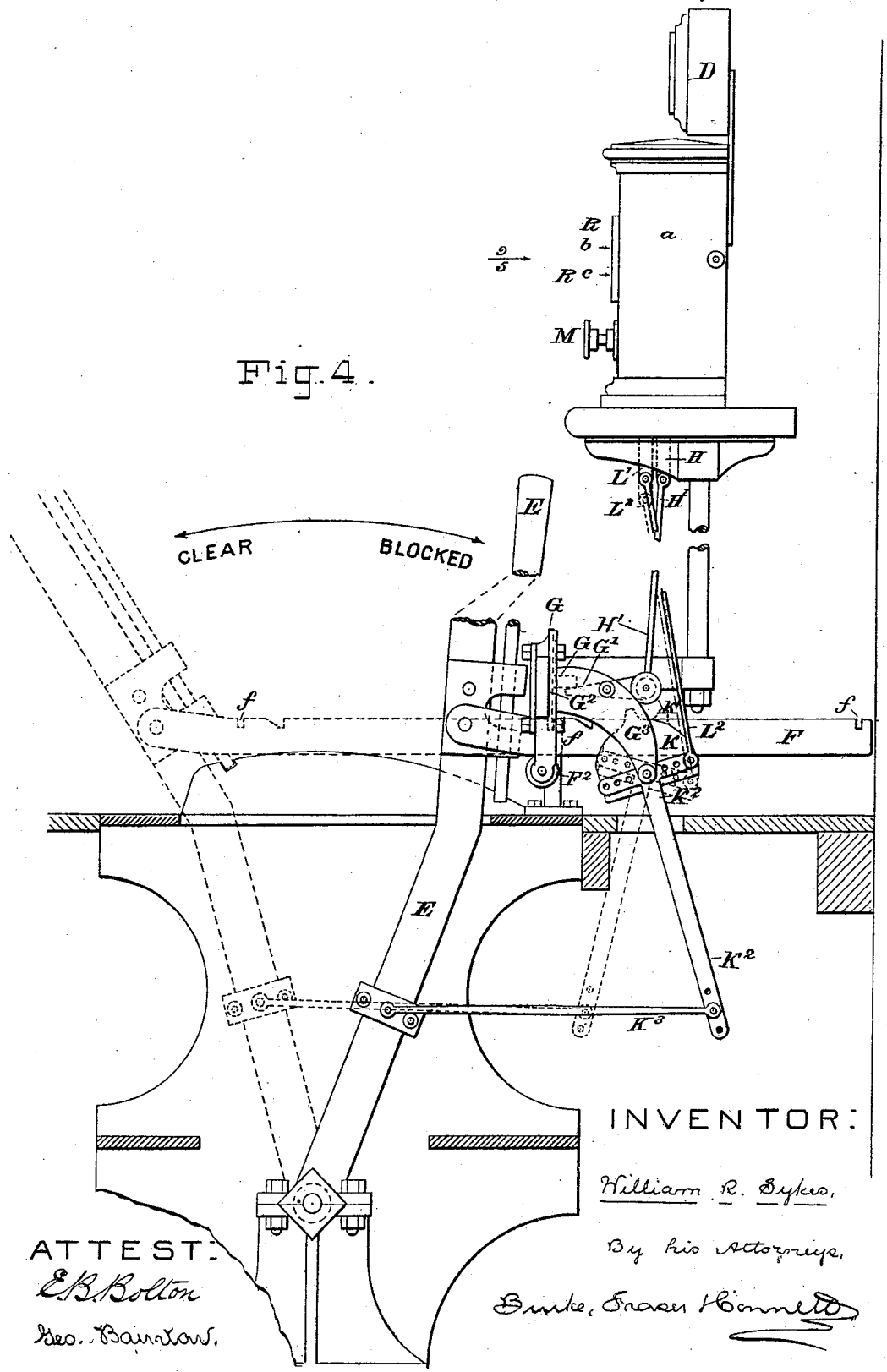

(No Model.) 9 Sheets—Sheet 3.
W. R. SYKES.
Electric Railway Signal Apparatus.
No. 241,246. Patented May 10, 1881.
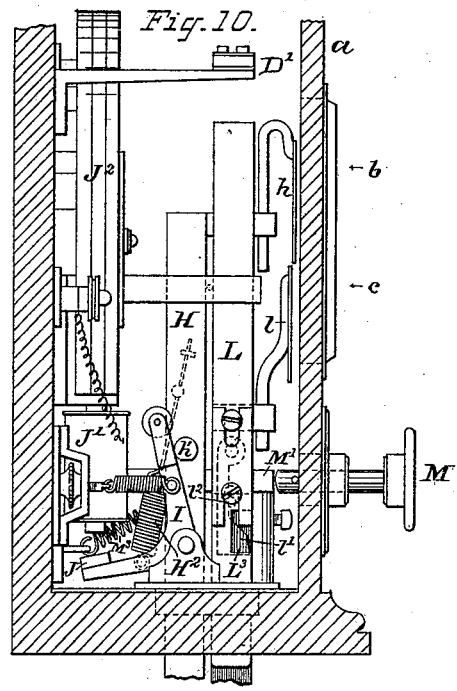
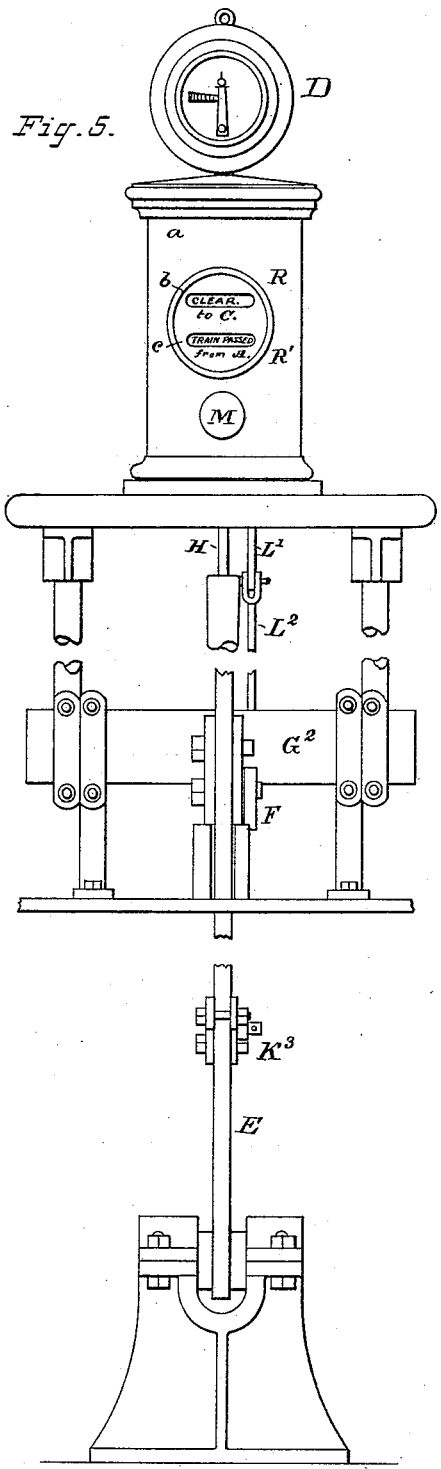
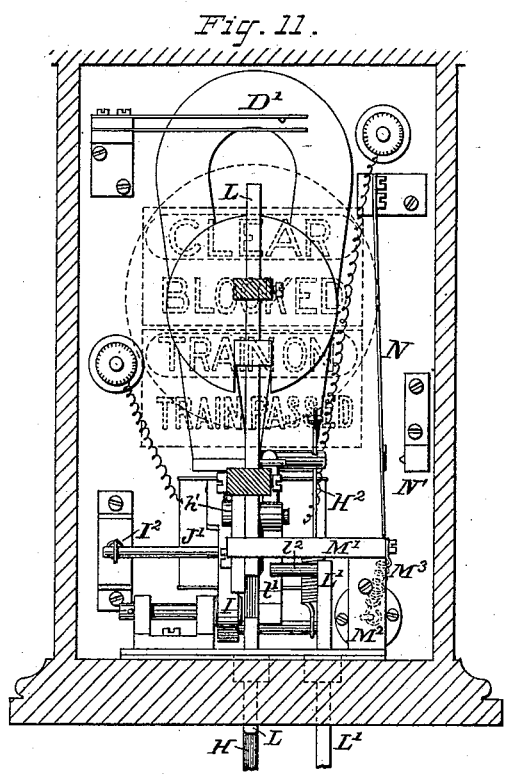
ATTEST,
E. B. Bolton
Geo. Bainton
INVENTOR,
William R. Sykes.
By his Attorneys,
Burke, Fraser & Connett

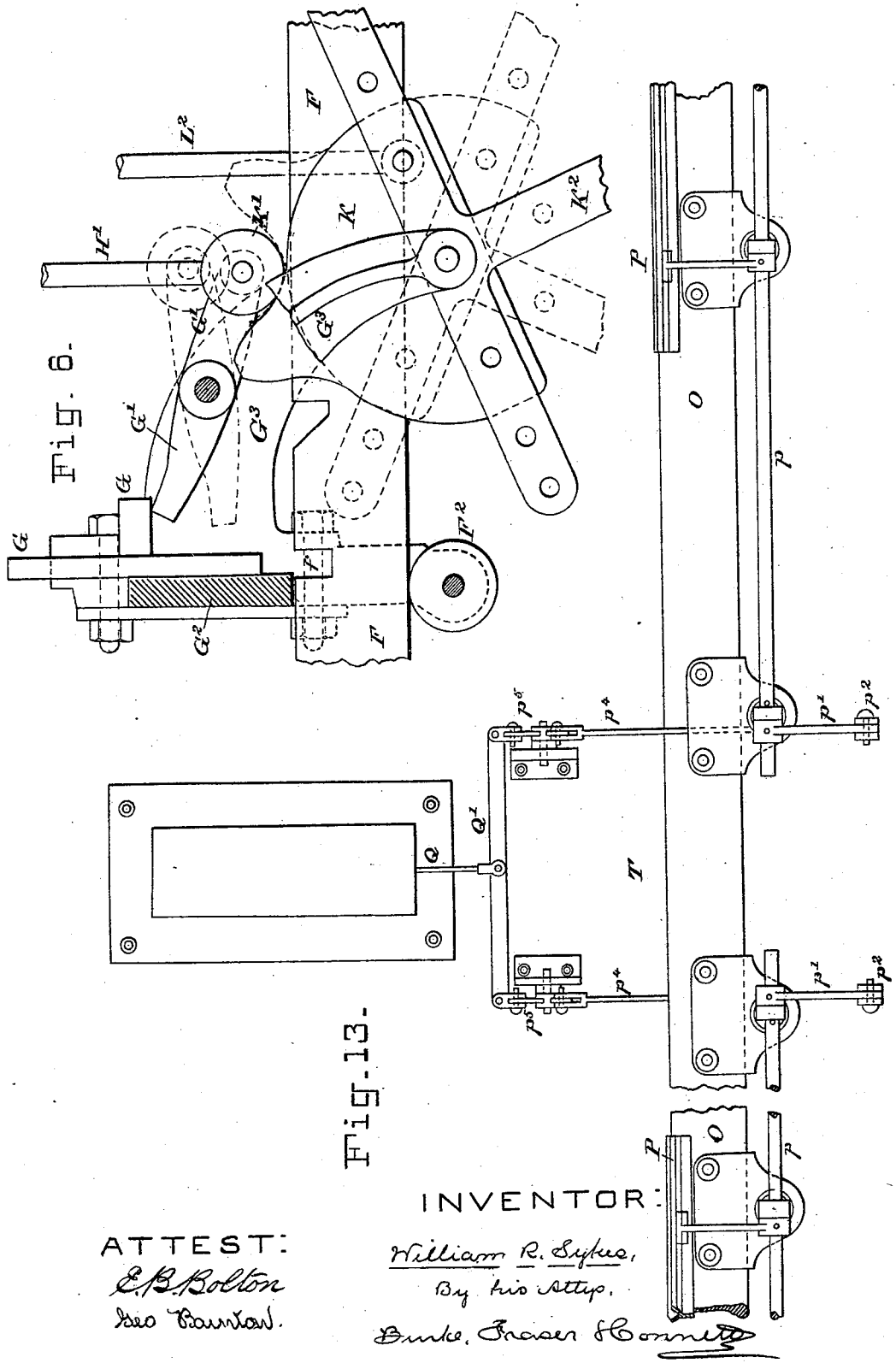

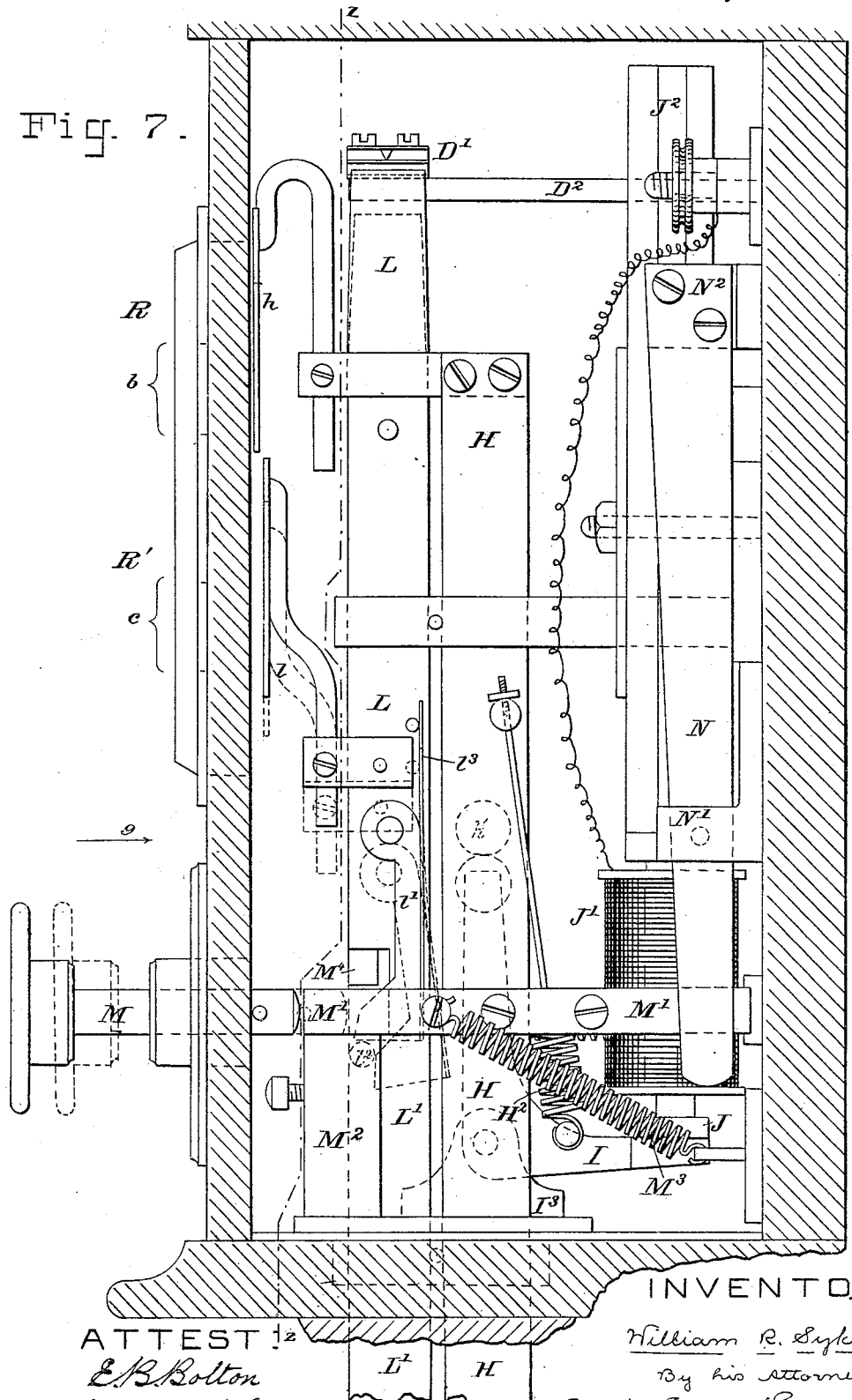

(No Model.)
9 Sheets—Sheet 6.

W. R. SYKES.
Electric Railway Signal Apparatus.

No. 241,246. Patented May 10, 1881.

ATTEST:
E. B. Bolton
Geo. Bainton

INVENTOR:
Wm. R. Sykes
By his Attorneys,
Burke, Fraser & Connett

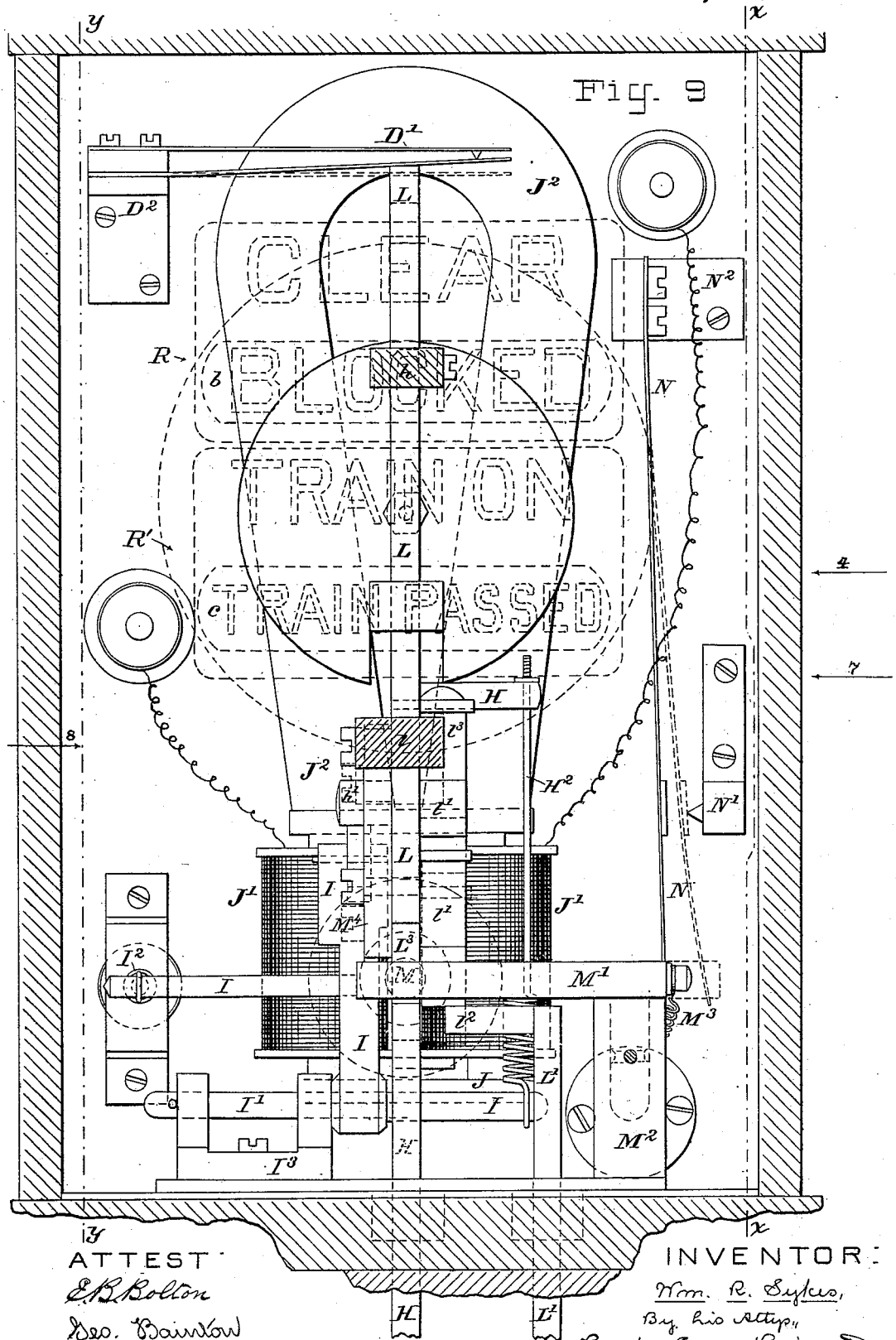

(No Model.) 9 Sheets—Sheet 8.
W. R. SYKES.
Electric Railway Signal Apparatus.
No. 241,246. Patented May 10, 1881.
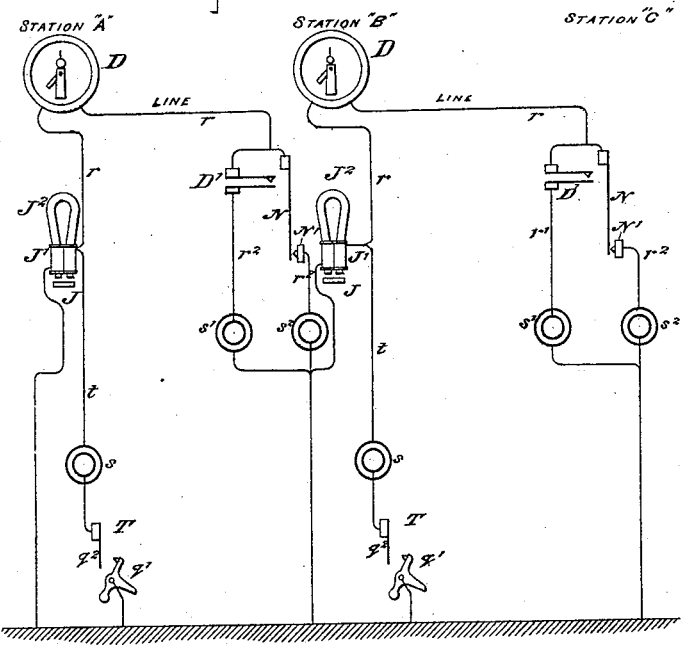
Fig. 14.
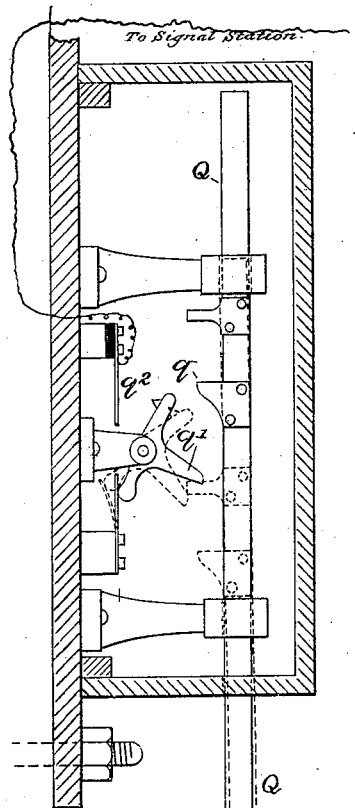
Fig. 12.
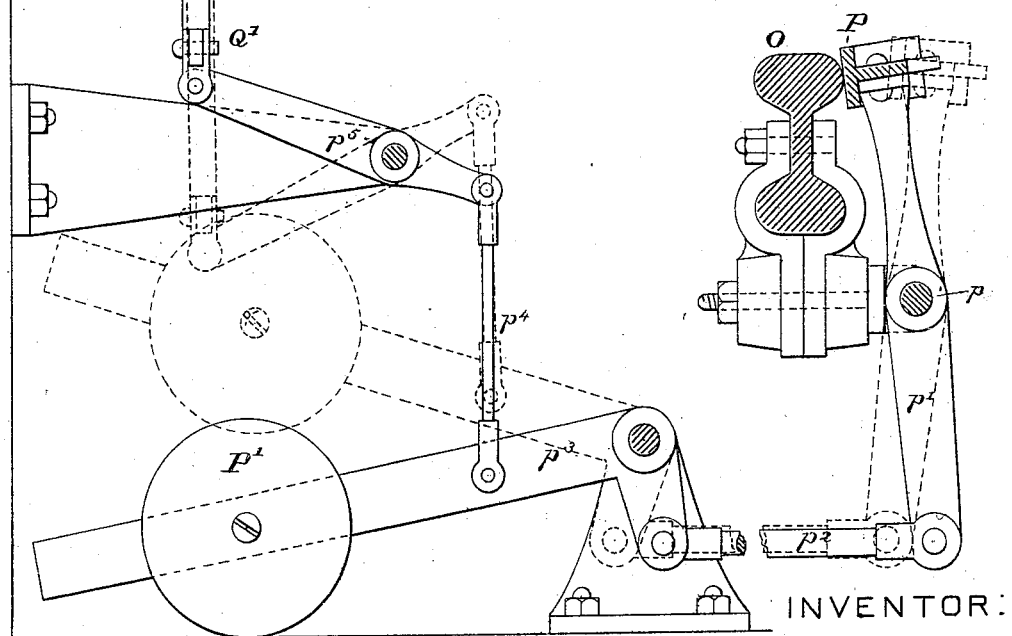
ATTEST:
E. B. Bolton
Geo. Bairstow
INVENTOR:
William R. Sykes.
By his Attorneys,
Burke, Fraser & Connolly (No Model.) 9 Sheets—Sheet 9.
W. R. SYKES.
Electric Railway Signal Apparatus.
No. 241,246. Patented May 10, 1881.
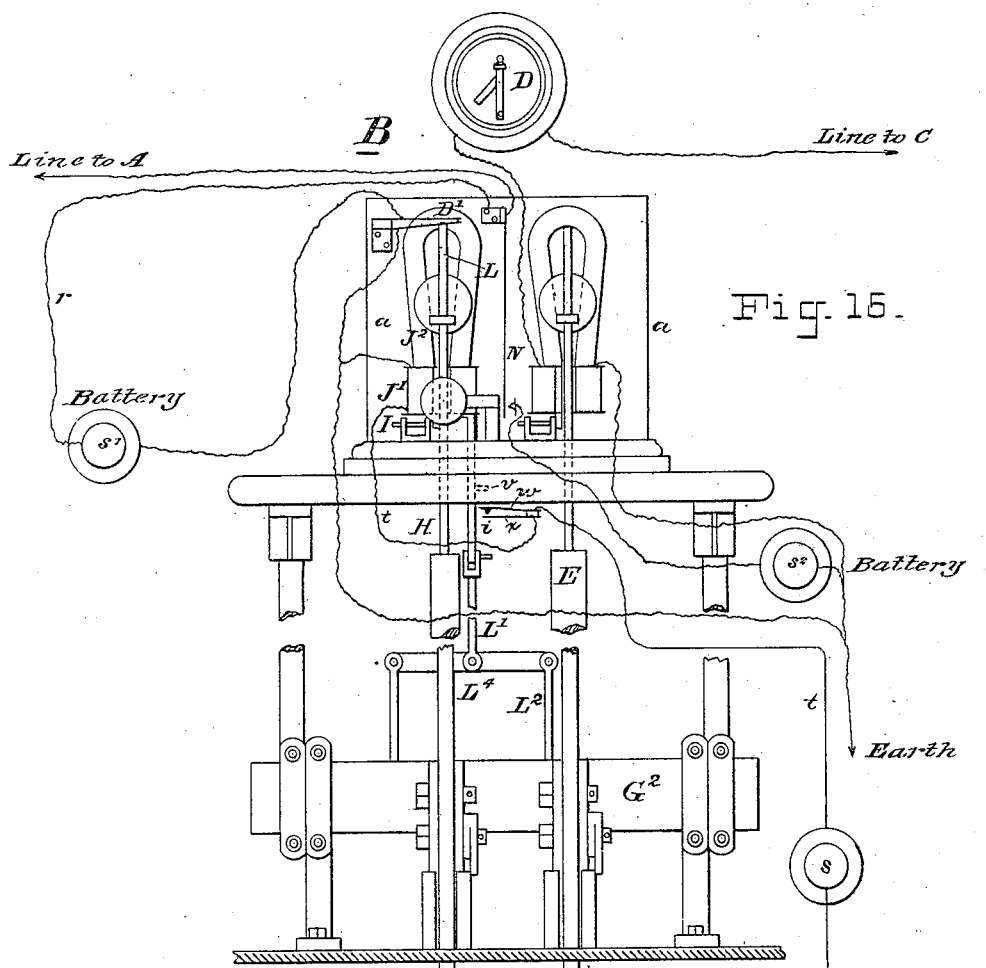
Fig. 16.
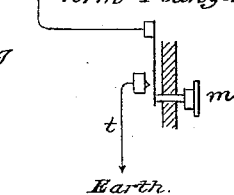
ATTEST:
E. B. Bolton.
Geo. Barstow
INVENTOR:
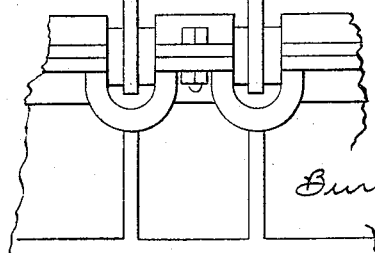
William R. Sykes.
By his Attorneys,
Burke, Fraser & Connett
N. PETERS, Photo-Lithographer, Washington, D. C.

UNITED STATES PATENT OFFICE.

WILLIAM R. SYKES, OF NUNHEAD, COUNTY OF SURREY, ASSIGNOR TO FREDERICK CHEESWRIGHT, OF LONDON, ENGLAND.

ELECTRIC RAILWAY SIGNAL APPARATUS.

SPECIFICATION forming part of Letters Patent No. 241,246, dated May 10, 1881.

Application filed December 22, 1880. (No model.) Patented in England May 10, 1880.

*To all whom it may concern:*

Be it known that I, WILLIAM ROBERT SYKES, a subject of the Queen of Great Britain, residing at Nunhead, Surrey, England, telegraph-engineer, have invented certain Improvements in Electric Railway Signal Apparatus, of which the following is a specification.

This invention is the subject of Letters Patent of Great Britain No. 1,907, granted to me May 10, 1880.

My invention relates to block-signals for railways wherein the road is divided into sections, with a signal-station at the beginning of each section, and with a signaling apparatus at each station for signaling an approaching train to pass into the next section. In a previous invention of mine, which is the subject of an application for United States Patent filed December 16, 1880, I have provided these signaling apparatus with locks, to prevent their operation until the locks were electrically withdrawn from the next stations before and beyond. I now provide only a single lock to each signaling apparatus, which lock is withdrawn from the station in advance or from some intermediate point on the road.

My present invention consists of various novel features and mechanisms for carrying out this system of interlocking block-signals, all of which will be fully hereinafter set forth.

In the accompanying drawings, Figures 1, 2, and 3 are diagrams showing a portion of one track of a double-track railway, including three signal-stations, which I will call, for convenience, stations "A," "B," and "C."

Referring to these figures, I will first describe the external appurtenances of the signal-stations and the general operation of my signals, without reference to the actual mechanism by which the several operations are accomplished.

Each station is provided with a train-signaling apparatus of any suitable character, by which the engineer of an approaching train may be signaled either to stop or to proceed to the next station in advance. This apparatus may consist of the ordinary arm-semaphore, as I have shown at S in these figures, and I will so describe it.

A signal-lever, E, is provided at each station, in such operative connection with said semaphore that the pulling over of the lever by the signal-man will bring the semaphore into the condition understood as a signal for the train to proceed. I will assume that the semaphore normally stands horizontally at "danger," and that the lever is so connected with it that the pulling over of the lever lowers the semaphore to the "safety" position, that the train may pass.

Connected to the lever E is a locking-bar, F, which is provided with two locking-sockets or notches, *f f*, to be engaged by a lock or bolt, G. One socket *f* coincides with the lock G when the lever is "home" or in the "danger" or "blocked" position, and the other socket *f* with the lock when the lever is pulled over or in the "safety" or "clear" position. Thus the lever, and consequently the semaphore or train-signal, can be locked in either position.

In front of the signal-man is placed an indicator-case, *a*, containing two indicators, R and R′, which show respectively through the openings *b* and *c* in the case. The indicator R reads either "Clear" or "Blocked," and refers to the condition of the section of track beyond, while the indicator R′ reads either "Train on" or "Train passed," and refers to the condition of the section of track in the rear. These words may be varied to suit any particular requirements, or signs or colors may be substituted for them. The indicator R is connected with the lock G in such manner that when it reads "Clear" the lock G is lifted and the lever E is free, but when it reads "Blocked" the lever is locked.

Beyond each station is an automatic track-treadle, T, being any suitable device actuated by the passage of a train to manipulate a circuit extending back to the indicator R at the station. Each station is also provided with an arm-galvanometer, D, which serves as an additional indicator. Its purpose will be described presently.

The operation is as follows: Before the commencement of the day's traffic all the semaphore-arms are raised to "danger," all the levers E are home and unlocked, all the indicators R read "Clear," all the indicators R′ read "Train on," and all the galvanometers D have their arms up at right angles, all as shown at station B in Fig. 1. A train at A being ready to start, the lever E is pulled over, thus dropping the semaphore S, after which the train may start. The indicator R now reads "Blocked," the indicator R' reads "Train on," and the lever E is locked. When the last car of the train passes the track-treadle T the lever is unlocked and the indicator R changes to "Clear." The lever may now be returned home by the signal-man, when it will again be locked. The parts are now in the condition shown in Fig. 1. When the train approaches station B the signal-man there pulls over his lever E and drops his semaphore, that the train may pass. This motion changes his indicators in the same manner as at A and locks his lever in its "clear" position. The parts are now as shown in Fig. 2. Meanwhile the lever at A is locked, and to unlock it B must press in a knob or plunger, M, which is arranged on the front of his case a; but this he cannot do until his lever has been unlocked and returned home. When the train passes B's treadle T his indicator R shifts to "Clear" and his lever E is unlocked, and may then be returned home. This act sets his indicator R to "Blocked" again, locks his lever, and sets his indicator R' to "Train passed." It also sends a current through the galvanometer D at station A in such direction that its arm drops to indicate that the section between A and B is clear. The parts are now as shown in Fig. 3. A may now ask B, through a telephone or by an electric bell, to unlock his lever, or B may do so without receiving word from A. This he does by pressing in his plunger M, which sends an electric current to A, unlocks A's lever, shifts A's indicator R to "Clear," and causes the arm of A's galvanometer D to rise. When B releases the plunger, and it springs back, his indicator R' shifts to "Train on," (meaning that the section from A to B is in condition to receive a train,) and it is then locked, so that the plunger cannot be worked again until the lever E has been pulled over and returned. The lever E remains locked until the train has passed C's treadle and C has pressed in his plunger M. Should another train approach B from A before C has thus unlocked B's lever, B cannot lower his semaphore, (even should he attempt to do so,) and the train must stop until B's lever is unlocked by C. Thus it is evident that it is not possible for one train to approach nearer to its leader than the distance between a signal-station and its treadle T.

I will now describe the electrical and mechanical means which I employ, and which are shown in the remaining figures of the drawings.

Figs. 4 to 13 represent the mechanism at station B, that at all the other intermediate stations being the same. Fig. 4 is a side elevation, partly in vertical section, of the apparatus at the signal-man's stand or platform, on a small scale. Fig. 5 is a front elevation of the same. Fig. 6 is an enlarged fragmentary view corresponding to Fig. 4. Fig. 7 is an enlarged elevation, looking in the same direction as Fig. 4, of the upper mechanism contained in the box or case a, the box being in section taken in the plane of the dotted line x x in Fig. 9. Fig. 8 is a similar view to Fig. 7, but looking in the opposite direction, the box a being in section taken in the plane of the dotted line y y in Fig. 9. Fig. 9 is also an enlarged view, being a front elevation of the mechanism in said box, looking in the direction of the arrow 9 in Figs. 4, 7, and 8, and the box being in section taken in the plane of the dotted line z z in Figs. 7 and 8. Figs. 10 and 11 are views on a smaller scale, corresponding respectively to Figs. 8 and 9, and showing a different position of the apparatus. Fig. 12 is a side elevation, partly in vertical section, of the treadle device on the track and the signaling mechanism operated thereby. Fig. 13 is a front view of the treadle device on a smaller scale. Fig. 14 is a diagram showing the circuit-connections of station B with stations A and C; and Fig. 15 is a view corresponding to Figs. 5 and 14, and showing a modification.

Referring first to Figs. 4, 5, and 6, E is the signal-lever; F, the locking-bar; f f, the notches therein, and G the lock already referred to. I provide a releasing mechanism whose operation withdraws the lock G out of engagement with the notches f, which mechanism constantly tends to so operate, and which, when set, is restrained from operating by an electro-magnetic detent. This mechanism consists of a lever, G', whose one arm takes under a projection on the lock G, and whose opposite arm connects by a rod, H', to a sliding bar, H, within the case a. (Shown in Figs. 7 to 11.) This bar H has a projection or shoulder, h', which, when the bar is lifted, rests on and is upheld by the end of one arm of an elbow-lever, I, whose other arm bears the armature J of a polarized magnet, J', which consists of an electro-magnet re-enforced by a permanent or horseshoe magnet, $J^2$. When an electric current passes through the coils of the electro-magnet in such direction as to cause it to release or repel its armature (which may be a permanent magnet) the vertical arm of the lever I passes out from beneath the projection h', the bar H drops, as shown in Figs. 10 and 11, tilting the lever G' into the position shown in full lines in Fig. 6, and thereby lifting the lock G. The elbow-lever I is acted on by two springs—one (lettered $I^2$) tending to draw the armature J away from the magnet, and the other (lettered $H^2$) connected to the bar H, and tending, when H is raised, to force the armature toward the magnet.

The indicator R is worked by the bar H, and consists of a plate, h, carried by an arm which is fixed to said bar, and having on its face the words "Clear" and "Blocked," as shown in dotted lines in Fig. 9, one or other of which always stands opposite the opening b. When the bar H is up and the lever E is locked the word "Blocked" shows through the opening, and when the bar H is down and the lock G is lifted so that the lever E is free, the word "Clear" is behind the opening. The bar H is raised and set by the moving of the lever E in either direction, it being set at mid-stroke of the lever.

K is a rocking cam rocked or oscillated by a lever, K², whose lower arm connects by a pitman, K³, to the lever E. The pulling over of the lever E to "Clear" moves the lever K² to the position shown in dotted lines in Fig. 4, and a projection on the cam K engages an anti-friction wheel, K', on either the lever G' or rod H' and lifts it, thus lifting the rod H' and bar H and permitting the lock G to drop. The raising of the bar H distends the spring H², which pulls the lever I into position to engage the projection h', and thereby uphold the bar H.

The magnet J' is in two circuits, one of which, r, extends to station C in advance, and the other, t, to the track-treadle T in advance, as clearly shown in Fig. 14. The circuit r to station C passes first through the galvanometer D, and at station C divides into two branches, r' and r², each of which is provided with a battery and with circuit breaking and closing springs. The branch r' contains springs D' and battery s'. The branch r² contains spring N and battery s², whose poles are reversed relatively to battery s', so that while the former sends a negative current through circuit r the latter sends a positive current through that circuit. When the branch r' is closed, by pressing together the springs D', the current from battery s' causes the arm of galvanometer D at B to drop to "Clear," and causes the magnet J' at B to attract its armature with still greater strength, instead of to release or repel it, and hence does not free the bar H or lever E; but when the branch r² is closed at spring N, while the branch r' is broken, the current from battery s² causes magnet J' at B to releases its armature, thus unlocking lever E at B.

Referring to Figs. 7 to 11, D' and N are the springs at B, corresponding to those at C just described. M is a plunger or push-knob, which takes against one arm of an elbow-lever, M', within the case a, fulcrumed on a standard, M², and kept in place by a spring, M³, whereby the plunger is kept pushed out. The other arm of the lever M' takes behind the spring N, and when the plunger is pushed in it presses the spring against the bracket N', and thereby closes the circuit r r² and unlocks the signal-lever at A.

L is another vertical sliding bar within the case a. When it is up its upper end presses together the springs D', thereby closing the circuit r r' and sending a current through the galvanometer D at A. The bar L is upheld by a spring-dog or click, l', pivoted to it, resting on a pin, l², fixed to another vertical bar, L', which extends down through the bottom of the case a, and is connected through the rod L², Figs. 4 and 5, to one arm of the lever K². When the lever E stands at "Blocked" the bar L' is up; but when the lever is pulled over to "Clear" the bar L' is down. The bar L has a recess, L³, cut in its front edge, just behind the lever M', which recess that lever enters when pushed back by the plunger M, and in doing so it encounters the dog l' and pushes it back off from the pin l², thus permitting the bar L to drop until the upper side of its recess L³ rests on the lever M', and when the plunger is released, and it and the lever M' spring forward, the bar L drops to its lowest position, as shown in Figs. 10 and 11, thus moving the recess L³ below the lever M', so that the latter cannot be again pushed back, because it comes against the front edge of the bar L. When the lever E is pulled over, thus drawing down the bar L', the pin l² on the latter wipes past the beveled part of the dog l', pressing the latter back until it has passed below it, when the dog springs back to place over the pin l². When the lever E is returned to "Blocked," and the bar L' and its pin l³ are consequently raised, the bar L is raised with it.

The indicator R' is operated by the bar L. It consists of a plate, l, bearing the words "Train on" above and the words "Train passed" or "Clear" below, and borne by an arm fixed to the bar L. (See Figs. 7 to 11.) One or other of these words is always exposed through the opening c. When the lever E is pulled over to "Clear" the bar L is always down and the indicator R' reads "Train on." When the lever E is replaced to "Blocked" the indicator R' is set to read "Train passed" or "Clear," and it remains so until the signal-man pushes in the plunger M, when it drops to "Train on."

The track-treadle T beyond the signal-station is shown in Figs. 12 and 13, and indicated in the diagrams Figs. 1, 2, 3, and 14. A tread-bar or thrust-bar, P, lies alongside the rail O, and is of sufficient length to engage at the same time the wheels at both ends of a passing car, or the adjacent wheels of two adjoining cars. It is mounted on arms fixed to a shaft, p, so that when it is forced away from the rail by the flange of a car-wheel entering between it and the rail the shaft will be slightly oscillated. An arm, p', projecting below the shaft p, connects through a rod, p², with one arm of a lever, p³, whose other arm bears a weight, P', whose action is to force the thrust-bar P against the rail. The weighted arm of the lever p³ connects through a rod, p⁴, with another lever, p⁵, which is itself connected to a slide-bar, Q, in a case. This bar bears a toe, q. In the case is an elbow-lever, q', which connects with earth, and a spring, q², which connects through a battery, s, Fig. 14, with the magnet J' back at the station. When a train reaches T the flange of the first wheel enters between rail O and thrust-bar P, pushes bar away from rail, lifts weight P', and draws down bar Q, all the parts being then in the position shown in dotted lines in Fig. 12. The successive wheels of the passing train engage the bar P, each before the preceding one has released it, and it is thus kept away from the rail until the last car of the train has passed, when it returns to the rail and all the parts return to their normal positions. (Shown in full lines in Fig. 12.) In doing so the toe q on the bar Q, while rising, engages the lever $q'$ and forces it to make contact with the spring $q^2$, thus closing the circuit $t$, Fig. 14, and causing the magnet J' at station B to release its armature, thereby withdrawing the lock at that station, and permitting the signal-man to return his lever E to "Blocked." Before the bar Q reaches its uppermost position its toe $q$ slips past the lever $q'$, which then drops back to its normal position, thus breaking the circuit $t$ again.

In practice I employ two thrust-bars, P, and set one a few feet in advance of the other on the track, and connect the levers $p^5$ of the two thrust-bars to a single bar, Q, through the medium of a cross-bar, Q', whose ends are jointed to the levers $p^5$, and which connects with the bar Q at its middle, as shown in Fig. 13. If a hand-car or trolley be passing along the track, it operates the two bars P successively, releasing one before it engages the other, so that the bar Q is pulled down only half-way, which is not sufficient for its toe $q$ to get beneath the lever $q'$, and so the circuit $i$ is not closed; but if a train be passing, the second bar P will be engaged before the first is released, thereby pulling down the bar Q to its full extent, so that when the last car passes off the circuit $t$ will be closed.

The operation is as follows: Assuming at the commencement that the parts are in the positions shown in Figs. 4, 5, 7, 8, and 9, and at station B in Fig. 3 a train has passed the station, it has crossed the treadle T beyond, and it is proceeding on toward station C. The signal-man at B has returned his lever E to "Blocked" and raised his semaphore, but has not yet pressed in his plunger. No other train can pass A until he does press his plunger. The galvanometer at A shows that the line between A and B is clear. The signal-man at B will next press in his plunger, whereupon the parts assume the positions shown in dotted lines in Figs. 7 and 9. When the plunger is released the bar L drops clear down, as seen in Figs. 10 and 11. When the train has passed C's treadle T and C has returned his lever to "Blocked" and presses in his plunger, then B's magnet J' releases its armature J, which assumes the position shown in Fig. 10, and the bar H drops, as shown in Figs. 10 and 11, thus lifting the lock G, and thereby unlocking B's lever E. When the next train approaches from A, B pulls over his lever E to lower his semaphore, that the train may pass, and in so doing sets up the bar H at mid-stroke, so that the lock G can again fall into the notch $f$ and lock the lever. When the train passes the treadle T, as already described, a current from there causes the magnet J' at B to again withdraw the lock G, whereupon the lever E may be returned home. In doing so the bar H is set back at mid-stroke and the bar L at full stroke, or when the lever is fully home, when it again becomes locked.

It will be observed that when the lever E is locked in its "clear" position it is unlocked from T, but when in its "blocked" position it is unlocked from station C.

It will be evident that at junctions, where one line feeds several, the plunger M, which unlocks the signal-lever at the preceding station on that one line, so that a train may approach on that line, must have its bar L arranged in connection with all of the levers, so that whichever branch track the train passes onto the movement of the lever for that track, either forward or back, will act to set up the bar L, and thereby permit the plunger to be again worked. In such case all the levers feeding the other lines would be locked from the signal-stations in advance.

In lieu of employing the track-treadle T to be operated automatically by the passage of the train, a plunger may be provided at the same location on the line, to be operated manually by the station-staff at B in the same manner and to the same effect as the plunger M at C is operated by the signal-man there. This arrangement is shown in Fig. 15, which shows the apparatus in front elevation, with the circuit-connections in diagram.

$m$ is the plunger, which I call the "platform-plunger," supposed to be located along the track beyond the station, and adapted, when pressed in, to close the circuit $t$. This circuit has another break at $i$, which is open while the lever E is home, but closes automatically when the lever is pulled over to "Clear," so that if the platform-plunger be operated when the lever is home it will be impotent to unlock it. The break $i$ consists of two springs, $w$ and $x$, which normally separate, but are pressed together by a pin, $v$, on the bar L', while the lever is pulled over to "Clear."

In case two signal-levers are used—a starting-lever to control the signal or semaphore at the signal-station and a distant lever to control another signal on the line some distance beyond, as is common—the bar L will be in connection with both levers through a cross-lever, L⁴, as also shown in Fig. 15, so that the working of either lever will operate the bar.

As the results of my invention may be obtained by the use of very different mechanical means, I do not wish to be understood as limiting myself at all closely to the actual mechanism shown.

I claim as my invention—

1. In a block signaling system for railways, the combination of a train-signal mechanism for operating the same, means for locking said mechanism in both the "clear" and "blocked" positions of the signal, electro-magnetic means for unlocking the same when the signal is "clear," controlled from one remote point on the line, and when the signal is "blocked" controlled from another remote point on the line, substantially as set forth.

2. In a block signaling system for railways, the combination of a train-signal, mechanism for operating the same, an automatic lock adapted to engage said mechanism when the signal is in either the "clear" or "blocked" position, and to automatically engage itself therewith upon the shifting of the signal from either position to the other, mechanism for withdrawing said lock, tending normally to withdraw it and restrained by an electro-magnetic detent, and electrical means controlled from a remote point on the line for withdrawing said detent, and thereby unlocking the signal, substantially as set forth.

3. A train-signal and its operating-lever, in combination with a lock adapted to engage it in two positions, at "clear" and at "blocked," and tending to so engage it, with mechanism tending to withdraw said lock, with an electro-magnetic detent adapted to restrain said mechanism, and with means for setting or restoring said withdrawing mechanism after its operation by the movement of the lever from one position to the other, whereby the lever when unlocked in one position may be moved to the other position, and in doing so renders the lock free to engage it in said latter position, substantially as set forth.

4. A train-signal and its operating-lever, in combination with two indicators adapted to be set up by the movement of the lever, one upheld by an electro-magnetic detent and adapted to be dropped by the withdrawal of the detent electrically from the station in advance, and the other upheld by a mechanical detent and adapted to be dropped by the act of manipulating a circuit extending to the station in the rear in such manner as to withdraw the electro-magnetic detent there, substantially as set forth.

5. The combination, in a block signaling system for railways, of a train-signal and its operating-lever at one station, a lock adapted to engage said lever and prevent its operation, electro-magnetic means for withdrawing said lock, a circuit extending thence to the station beyond, a train-signal and its operating-lever at said latter station, means for manually manipulating said circuit at said latter station in such manner as to withdraw the lock at the former station, and means for preventing the repetition of such manipulation until the lever at the said latter station has been pulled over and again replaced in its normal position, substantially as set forth.

6. The combination at one signal-station, as A, of a train-signal and its lock, means for electrically withdrawing said lock, and an arm galvanometer or equivalent electrically-actuated indicator, with an electric circuit extending thence to the station B in advance, and at the latter station, B, a train-signal, a manually-operated circuit-manipulating device the operation of which serves to unlock the signal at the preceding station, A, and an automatically-operated circuit-manipulating device the operation of which serves to actuate said galvanometer, said latter circuit-manipulating device being in such operative connection with the train-signal at B that the return of the latter to "blocked" after the passage of a train will cause said galvanometer to indicate that the line is clear between A and B, whereby the signal-man at A knows that the signal-man at B may electrically unlock the signal at A, substantially as set forth.

7. The combination of lever E, locking-notches $ff$ in connection therewith, lock G, sliding bar H, connecting parts interposed between G and H, whereby the dropping of H withdraws G, plate $h$, borne by H and moved thereby before opening $b$, and an electro-magnetic detent adapted to uphold the bar H, substantially as set forth.

8. The combination of lever E, notches $ff$ in connection therewith, lock G, sliding bar H, connecting parts interposed between G and H, whereby the descent of H withdraws G, an electro-magnetic detent adapted to uphold bar H, cam K, arranged to be oscillated by the movement of lever E, and means interposed between K and H, whereby the oscillation of the former in either direction lifts the latter into engagement with its detent, substantially as set forth.

9. The combination of the sliding bar L, recess $L^3$ in said bar, movable part $M'$, arranged opposite said recess and capable of being pressed back into the same, dog $l'$ for upholding said bar, arranged to be tripped by the backward movement of $M'$, thereby dropping the bar until its recess $L^3$ passes below $M'$, whereby $M'$ cannot be again pressed back until L has been raised, substantially as herein set forth.

10. The combination of the lever E, the vertically-moving part $L'$, connecting parts interposed between E and $L'$, whereby, when the former is home, the latter is raised, and when the former is pulled over the latter is lowered, the vertically-sliding bar L, the dog $l'$, and pin or shoulder $l^2$, interposed between L and $L'$, whereby L may be lifted and upheld by $L'$, and means for moving dog $l'$ out of engagement with shoulder $l^2$, and consequently dropping the bar L, substantially as set forth.

11. The combination of galvanometer D at one station, circuit $r$ $r'$, extending thence to the station beyond, and there including circuit-closing springs $D'$, sliding bar L, arranged to press said springs together when raised, signal-lever E, connecting parts interposed between E and L, whereby the home movement of E raises L against said springs, and means for disconnecting L from E, whereby L may be dropped independently of any movement of E, substantially as set forth.

12. The combination of circuit-closing spring N, lever $M'$, plunger M, and locking-bar L, arranged to be dropped by the pressing of the plunger, and adapted when dropped to prevent the further pressing in of the plunger, substantially as set forth.

13. In a block signaling system for railways, the combination of galvanometer D, detent-magnet $J'$, affected only by currents in one direction, and signal-unlocking mechanism normally restrained by said magnet at one signal-station, circuit $r$, including D and $J'$ and extending thence to the station beyond, branches $r'$ and $r^2$ in said circuit at the latter station, batteries $s'$ and $s^2$, arranged one in each branch, with reversed poles, means for automatically closing one of said branches by the return of the signal at said latter station to its normal position after its operation, whereby a current is sent through circuit $r$ in the direction to affect said galvanometer, but not to affect said magnet, and means for manually closing the other of said branches and simultaneously opening the first, whereby a current is sent through circuit $r$ in the contrary direction, pre-arranged to affect said magnet, and thereby release said unlocking mechanism, substantially as set forth.

14. The combination of train-signal and its lever E, lock G, adapted to engage said lever in either its "clear" or "blocked" position, withdrawing mechanism tending to withdraw said lock, electro-magnetic detent adapted to withhold said mechanism, electro-magnet J' of said detent, arranged in two circuits, one, $r$, extending to the next station beyond, and the other, $t$, extending to an intermediate point on the line, whereby the lever may be unlocked from either said station beyond or said intermediate point, substantially as set forth.

15. The combination of contact spring or point $q^2$, contact-lever $q'$, toe $q$, sliding bar Q, bearing said toe, and mechanism for sliding said bar longitudinally back and forth upon the passage of a train over the track, whereby the movement of said bar and toe causes $q'$ to make electrical contact with $q^2$, substantially as set forth.

16. The combination of treadle or thrust bar P, arranged adjacent to the rail, adapted to be displaced by the flange of a passing wheel, tending to return to its normal position, and of such length as to be engaged by each following wheel of a train before the preceding wheel has cleared it, in combination with means for manipulating an electric circuit upon its return movement and not till then, whereby an electric transmission is effected by the passage of the last car of a train, substantially as set forth.

17. Two treadle or thrust bars, P, arranged one in advance of the other, with a short space between them, each adapted to be displaced by the wheels of a passing train, in combination with a dividing-lever, Q', its ends communicating each with one bar P and its center communicating with circuit-manipulating mechanism, whereby the displacement of either bar P moves said mechanism but half-way and fails to manipulate the circuit, and the simultaneous displacement of both bars P is necessary to effect the complete movement of said mechanism and the manipulation of the circuit, substantially as set forth.

In witness whereof I have hereunto signed my name in the presence of two subscribing witnesses.

WILLIAM ROBERT SYKES.

Witnesses:
THOS. E. DAY,
SIDNEY PEARS.